United States Patent [19]

Takiguchi et al.

[11] Patent Number: 4,481,507
[45] Date of Patent: Nov. 6, 1984

[54] ABNORMAL CONDITION WARNING APPARATUS FOR A SEWING MACHINE

[75] Inventors: Michitaka Takiguchi; Takao Sugaya, both of Nagoya, Japan

[73] Assignee: Brother Kogyo Kabushiki Kaisha, Aichi, Japan

[21] Appl. No.: 264,613

[22] Filed: May 18, 1981

[30] Foreign Application Priority Data

May 30, 1980 [JP] Japan .................................. 55-66731

[51] Int. Cl.³ ............................................ G08B 21/00
[52] U.S. Cl. ..................................... 340/679; 112/277; 340/677; 340/692; 364/470
[58] Field of Search ....................... 340/677, 679, 692; 112/272, 273, 277, 278; 364/468, 469, 470, 513, 550

[56] References Cited

U.S. PATENT DOCUMENTS

| | | | |
|---|---|---|---|
| 3,298,010 | 1/1967 | Dubosq et al. | 340/679 X |
| 3,581,014 | 8/1971 | Vogel et al. | 340/692 X |
| 3,870,818 | 3/1975 | Barton et al. | 340/692 X |
| 3,872,808 | 3/1975 | Wurst | 112/158 E |
| 4,166,423 | 9/1979 | Brienza et al. | 112/278 X |
| 4,215,641 | 8/1980 | Dobrjanskyj et al. | 112/278 |
| 4,256,047 | 3/1981 | Suzuki et al. | 112/277 X |

*Primary Examiner*—Glen R. Swann, III
*Attorney, Agent, or Firm*—Armstrong, Nikaido, Marmelstein & Kubovcik

[57] ABSTRACT

An abnormal condition warning apparatus for a sewing machine is disclosed. Plural detecting means disposed in the sewing machine detect the occurence of abnormal conditions in which stitch forming instrumentalities are prevented from forming a desired stitch pattern, and each of the plural detecting means generates a detection signal according to the detection. Plural groups of speech data are permanently stored in memory means, and each of the groups is predetermined to represent one of the abnormal conditions in voice. Selecting means selects one group from the plural groups according to the detection signal, an electric signal is generated based on the selected group, and electroacoustic means disposed in the machine speaks one of the abnormal conditions in response to the electric signal.

2 Claims, 2 Drawing Figures

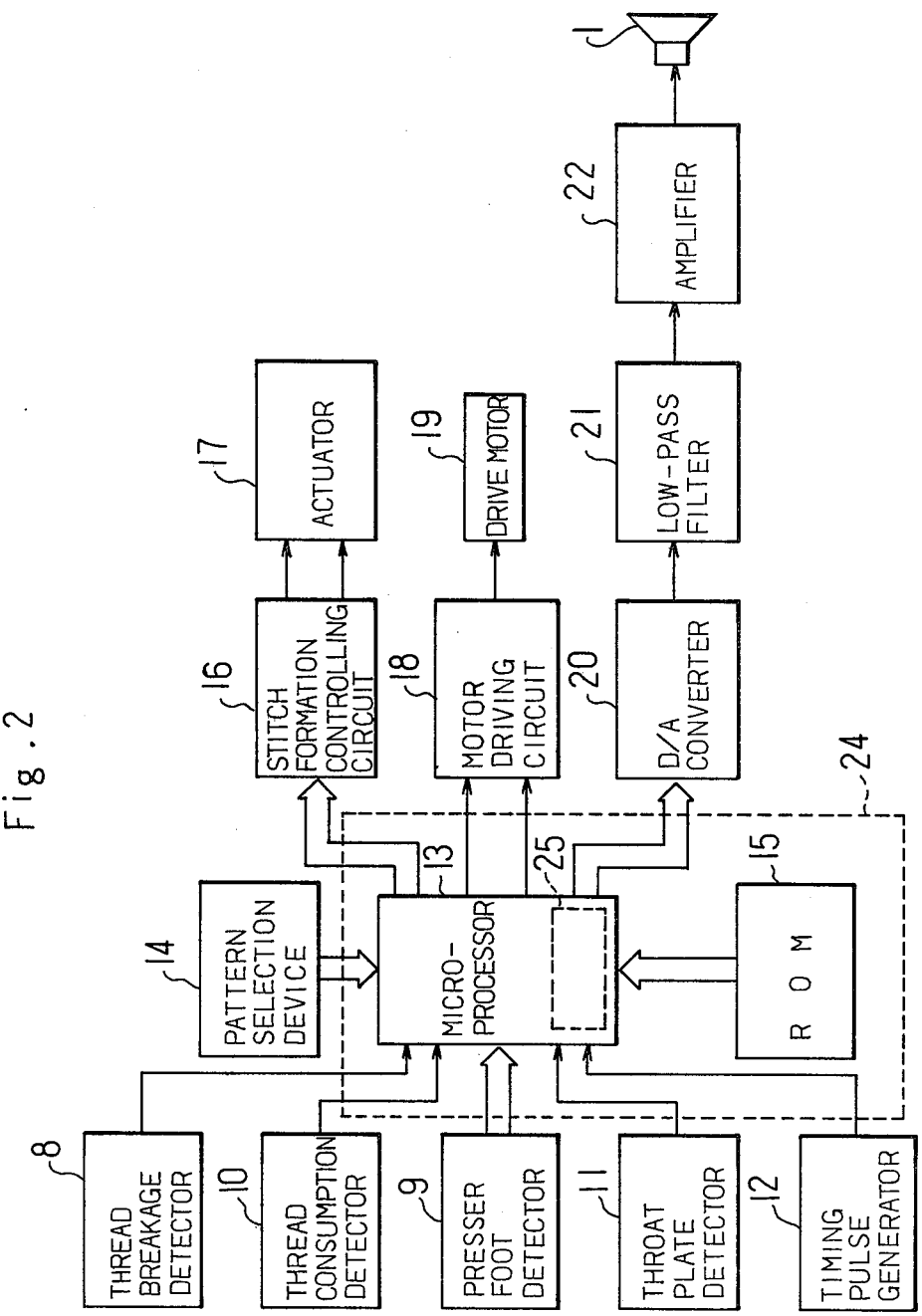

ABNORMAL CONDITION WARNING APPARATUS FOR A SEWING MACHINE

BACKGROUND OF THE INVENTION (1) Field of the Invention

The present invention relates to an abnormal condition warning apparatus for a sewing machine wherein a warning is generated in voice.

(2) Description of the Prior Art

In conventional sewing machines, detectors such as a thread breakage detector, a thread consumption detector and a drive motor locking detector are installed, and occurrence of abnormal condition in the machine working is indicated by lighting of a warning lamp. This manner has disadvantages, however, in that a worker cannot recognize abnormal portions easily and rapidly by only seeing the lamp blinking to indicate occurence of abnormal condition.

SUMMARY OF THE INVENTION

In view of the above mentioned prior art, an object of this invention is to provide an abnormal condition warning apparatus for a sewing machine, wherein plural detectors are disposed at specific portions of the sewing machine, and in response to the detection the abnormal portion is clearly indicated in voice to a worker.

In order to attain this object, the present invention constitutes an abnormal condition warning apparatus for a sewing machine having stitch forming instrumentalities, comprising: plural detecting means disposed in the sewing machine for detecting the occurence of abnormal conditions in which the stitch forming instrumentalities are prevented from forming a desired stitch pattern, each of the plural detecting means generating a detection signal according to the detection, memory means for permanently storing plural groups of speech data, each of said groups being predetermined to represent one of the abnormal conditions in voice; means for selecting one group from the plural groups according to the detection signal; means for generating an electric signal based on the selected group; and electroacoustic means disposed in the machine for speaking one of the abnormal conditions in response to the electric signal.

Other features and objects of this invention will be made clear in the following description with reference to the accompanying drawings. However, the drawings are for description and not for restriction of the scope of the invention.

BRIEF DESCRIPTION OF THE DRAWINGS

FIG. 2 is a block diagram showing arrangement of circuits of the sewing machine.

DESCRIPTION OF THE PREFERRED EMBODIMENT

Figure 1:
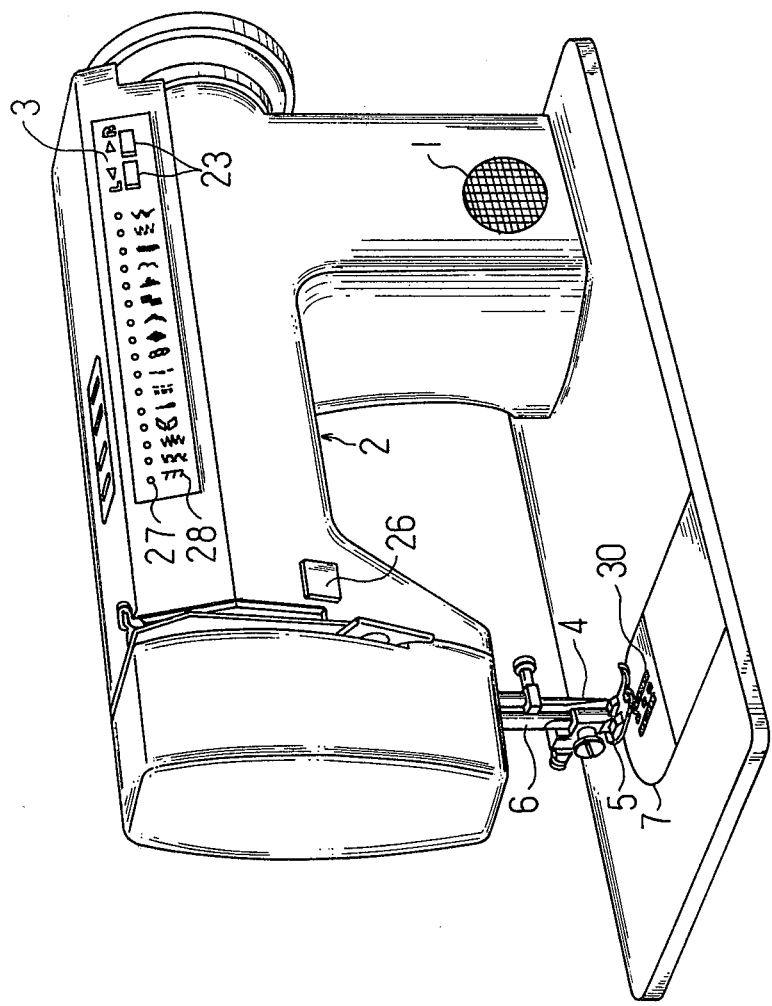
FIG. 1 is a perspective view of a sewing machine includng a preferred embodiment of the present invention.

An embodiment of the present invention will now be described referring to the accompanying drawings. At first, constitution of a sewing machine will be explained. A sewing machine comprises a bracket arm 2, and a pattern display panel 3 disposed on the front surface of the bracket arm 2. On the pattern display panel 3 is displayed a pattern symbol 28 showing each of plural patterns and light emitting diode 27 arranged corresponding to respective patterns. Two pattern selecting switches 23 and a manual switch 26 are also installed. Referring to a block diagram in FIG. 2, a microprocessor 13 reads out stitch data for forming stitch pattern in response to the signals applied thereto and generates command signals for controlling a drive motor 19. The microprocessor 13 acts also as a data selecting circuit 25 in an abnormal condition warning apparatus using speech data as hereinafter described. A pattern selection device 14 including the pattern display panel 3 provides a pattern code signal to the microprocessor 13, said pattern code signal corresponding to a desired pattern selected by the pattern selecting switches 23. A read-only memory (hereinafter referred to as ROM) 15 stores plural groups of speech data representing respective abnormal conditions previously specified corresponding to types of abnormal conditions of the sewing machine, for example, plural voice signals in digital form, and stitch data in digital form for constituting plural stitch patterns previously specified. The ROM 15 generates stitch data in response to the pattern code signal from the microprocessor 13 and provides the data to the microprocessor 13. Such a device as disclosed in U.S. Patent 3,872,808 may be used in the pattern selection device 14. Voice signals in digital form are stored in the ROM 15 as speech data of plural groups. A stitch formation controlling circuit 16 receives stitch data transferred from the microprocessor 13 and provides signals to an actuator 17 for driving a feed dog 30 and a needle 4 in order to form each stitch in the selected pattern in response to the stitch data. A linear actuator is used generally in the actuator 17. A motor driving circuit 18 receives command signals regarding start, stop and speed from the microprocessor 13 and controls a drive motor 19 in response to the signals. The sewing machine as above described is similar to known automatic multipattern sewing machines in its construction.

Now, detectors in five systems for detecting abnormal conditions in a sewing machine and an abnormal condition warning apparatus for generating voice signals in response to the detection will be described.

A thread breakage detector 8 disposed in thread feed passage detects the thread tension using a microswitch or the like or optically detects existence of the thread and provides a detection signal to the microprocessor 13 in the thread breakage state. Such a detector as disclosed in U.S. Pat. No. 3,587,497 may be used in the thread breakage detector 8. A presser foot detector 9 detects the type of a presser foot 5 in order to determine whether the pressor foot 5 exchangeably mounted to the lower end of a presser bar 6 is suitable to form the selected stitch pattern or not. The pressor foot detector 9 detects a bar code attached to various types of the presser feet 5 using optical transmission fibers and a light receiver installed to the lower end of the presser bar 6, and provides a detection signal to the microprocessor 13. The type of the presser foot 5 can be detected also by magnetic detecting means. A thread consumption detector 10 detects the amount of thread remaining in a thread bobbin optically and provides a detection signal when the amount of thread becomes less than a prescribed value. Such a detector as disclosed in U.S. Patent 4,178,866 may be used in the thread consumption detector 10. A throat plate detector 11 disposed to mounting portion of a throat plate 7 supplies the microprocessor 13 with a detection signal to distinguish whether the throat plate 7 installed to a prescribed position is for a straight stitch or a zig-zag stitch. Such a device as disclosed in U.S. Pat. No. 3,926,133 may be used for the throat plate detector 11. A timing pulse generator 12 provides pulse signals in response to reciprocation of the needle 4. Interruption or stop of the pulse signal causes the microprocessor 13 to detect that the drive motor 19 has locked due to applying some overload to driving system of the sewing machine including the motor. The pulse signal transmitted from the timing pulse generator 12 to the microprocessor 13 determines the timing to drive the actuator 17 during formation of the pattern.

The ROM 15 stores plural groups of voice signals in the form of digital code and in a predetermined sequence to speak words or sentences, such as "thread broken", which are related to the abnormal conditions to be detected by the detectors in five systems. The voice signals may be prepared in a manner that voice wave form of word according to human pronunciation is quantized in a certain sampling frequency. The voice signal in the ROM 15 is selectively read out in response to a command of the microprocessor 13. Accordingly, the microprocessor 13 together with the ROM 15 constitutes a data generating circuit 24. The voice signal read out by the microprocessor 13 is transmitted to a D/A converter 20 where the signal is converted into analog signal. The converted analog signal is transmitted through a low-pass filter 21 and an amplifier 22 to a speaker 1 disposed on the front surface of a bracket arm 2, thus voice is generated.

The data selecting and generating circuits may be constituted in a manner that human voices for warning are recorded in an endless tape and one selected voice in response to a selection command is regenerated by a regenerating device.

Operation of an abnormal condition warning apparatus for a sewing machine will be described. Prior to sewing operation, one stitch pattern is designated by the pattern selecting switches 23 and code signal of the designated pattern is transmitted from the pattern selection device 14 to the microprocessor 13. The detection signal of the presser foot detector 9 indicating the type of the installed presser foot 5 and the detection signal of the throat plate detector 11 indicating the type of the throat plate 7 are also entered to the microprocessor 13. The microprocessor 13 decides whether the installed throat plate and presser foot conform to the designated stitch pattern. If they do not conform, speech data in digital form, for example, data representing "presser foot caution" or "throat plate caution" is read out from the ROM 15. The read-out digital signal is transferred to the D/A converter 20 and converted into analog signal. High frequency component is eliminated from the analog signal in the low-pass filter 21 and the signal is amplified in the low frequency amplifier. Thus the warning in voice, such as "pressor foot caution" or "throat plate caution" is generated from the speaker 1. When such an abnormal condition is detected, the microprocessor 13 provides a command signal to the motor driving circuit 18 so as to stop the running of the drive motor 19.

When the presser foot and the throat plate conform to the designated pattern, speech data is not read out from the ROM 15, but the sewing machine starts if a manual switch 26 turns on. Stitch data regarding the designated stitch pattern is transmitted from the microprocessor 13 to the stitch formation controlling circuit 16, and the actuator 17 acts to control the work feed and the needle lateral jogging, thus stitching is performed in the designated pattern.

If thread is broken during the machine running, the detection signal representing the thread breakage is transmitted from the thread breakage detector 8 to the microprocessor 13. The microprocessor 13 receives this signal and reads out speech data representing "thread breakage" from specified addresses of the ROM 15 and transfers the speech data to the D/A converter 20. The speech data in digital code is converted by the D/A converter 20 into analog signal, thus the warning "thread breakage" is generated in voice from the speaker 1 in similar manner to above described. At the same time, the microprocessor 13 provides the stop command signal to the motor driving circuit 18 and the drive motor 19 is stopped at once.

When thread in the bobbin is consumed and becomes less than a prescribed amount during the machine running, the detection signal representing the thread consumption is transmitted from the thread consumption detector 10 to the microprocessor 13. Speech data representing "thread consumption" is read out from the ROM 15 in similar manner to above described, and transferred to the D/A converter 20, thus the warning "thread consumption" is generated in voice from the speaker 1.

When overload is applied to driving system such as the needle 4 and the drive motor 19 is locked, generation of pulse signals from the timing pulse generator 12 is stopped. The microprocesser 13 therefore reads out speech data representing "motor abnormal" from the ROM 15, and the speech data is transferred to the D/A converter 20 in similar manner to above described. Thus the warning "motor abnormal" is generated in voice from the speaker 1, and at the same time the motor driving circuit 18 is controlled to stop the drive motor 19.

According to the warnings representing abnormal conditions specifically in voice, a worker can know any abnormal state properly and take a remedy therefor.

What is claimed is:

1. In a sewing machine having stitch forming instrumentalities including a reciprocable and laterally joggable needle and a work-feed mechanism, a presser foot exchangeably mounted to the lower end of a presser bar and actuating means for imparting movement to said stitch forming instrumentalities to form a desired stitch pattern; the improvement comprising:
   a bar code attached to said presser foot;
   detecting means disposed in said machine for optically detecting said bar code and generating a detection signal representing said bar code;
   pattern selecting means for providing a pattern code signal corresponding to a desired stitch pattern of a plurality of predetermined stitch patterns;
   memory means for storing speech data related to the unsuitability of said presser foot;
   means for determining responsive to said detection signal and said pattern code signal whether or not said presser foot is suitable to form said desired stitch pattern and for extracting speech data from said memory means when said presser foot is unsuitable to form said desired stitch pattern; and
   electroacoustic means disposed in said machine for providing a voice sound responsive to said extracted speech data.

2. In a sewing machine having stitch forming instrumentalities including a reciprocable and laterally joggable needle and a work-feed mechanism, a presser foot exchangeably mounted to the lower end of a presser bar and actuating means responsive to stitch data for imparting movement to said stitch forming instrumentalities to form a desired stitch pattern; the improvement comprising:

a bar code attached to said presser foot;
detecting means disposed in said machine for optically detecting said bar code and generating a detection signal representing said bar code;
pattern selecting means for providing a pattern code signal corresponding to a desired stitch pattern of a plurality of predetermined stitch patterns;
a static memory disposed in said machine for storing a plurality of groups of stitch data corresponding to said plurality of predetermined stitch patterns and speech data related to the unsuitability of said presser foot;
a microprocessor operatively connected to said static memory for extracting one group of stitch data to be supplied to said actuating means from said static memory in response to said pattern code signal, said microprocessor being adapted to determine responsive to said detection signal and said pattern code signal whether or not said presser foot is suitable to form said desired stitch pattern and to extract said speech data from said static memory when said presser foot is unsuitable to form said desired stitch pattern; and
electroacoustic means disposed in said machine for providing a voice sound responsive to said extracted speech data.

* * * * *